(12) United States Patent
Krisher et al.

(10) Patent No.: US 6,474,873 B1
(45) Date of Patent: Nov. 5, 2002

(54) ADJUSTABLE PRELOAD SHIM FOR TAPERED BEARINGS

(75) Inventors: James A. Krisher; Gregory A. Fett, both of Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/842,122

(22) Filed: Apr. 26, 2001

(51) Int. Cl.[7] .............................................. F16C 19/36
(52) U.S. Cl. ...................................... 384/563; 384/583
(58) Field of Search ................................ 384/563, 583, 384/517, 571, 535, 581

(56) References Cited

U.S. PATENT DOCUMENTS

| | | |
|---|---|---|
| 2,702,868 A | 2/1955 | Kindig |
| 3,746,412 A | 7/1973 | Hay |
| 3,770,994 A | 11/1973 | Smith |
| 3,901,568 A | 8/1975 | Gadd et al. |
| 4,901,523 A | 2/1990 | Huelster |
| 5,046,870 A | 9/1991 | Ordo |
| RE36,058 E | 1/1999 | Sokol |
| 6,036,205 A | 3/2000 | Schlosser et al. |

*Primary Examiner*—Lenard A. Footland
(74) *Attorney, Agent, or Firm*—Liniak, Berenato & White

(57) ABSTRACT

An assembly by which to effect incremental adjustments to the end play, or preloading, to a bearing set. Relatively rotatable first and second thrust rings have contiguously juxtaposed and interacting ramp surfaces. Interposed between the first and second thrust rings is an indexing spring that provides incremental adjustment of the first thrust ring with respect to the second thrust ring. A plurality of indexing pawls formed on the indexing spring interacts with a plurality of indexing teeth formed on one of the thrust rings. The second thrust ring is selectively rotatable with respect to the first thrust ring to effect axial translation of the first thrust ring by virtue of the interaction between said opposed, contiguously juxtaposed ramp surfaces. The indexing pawls preclude reverse relative rotation of the thrust plates.

10 Claims, 7 Drawing Sheets

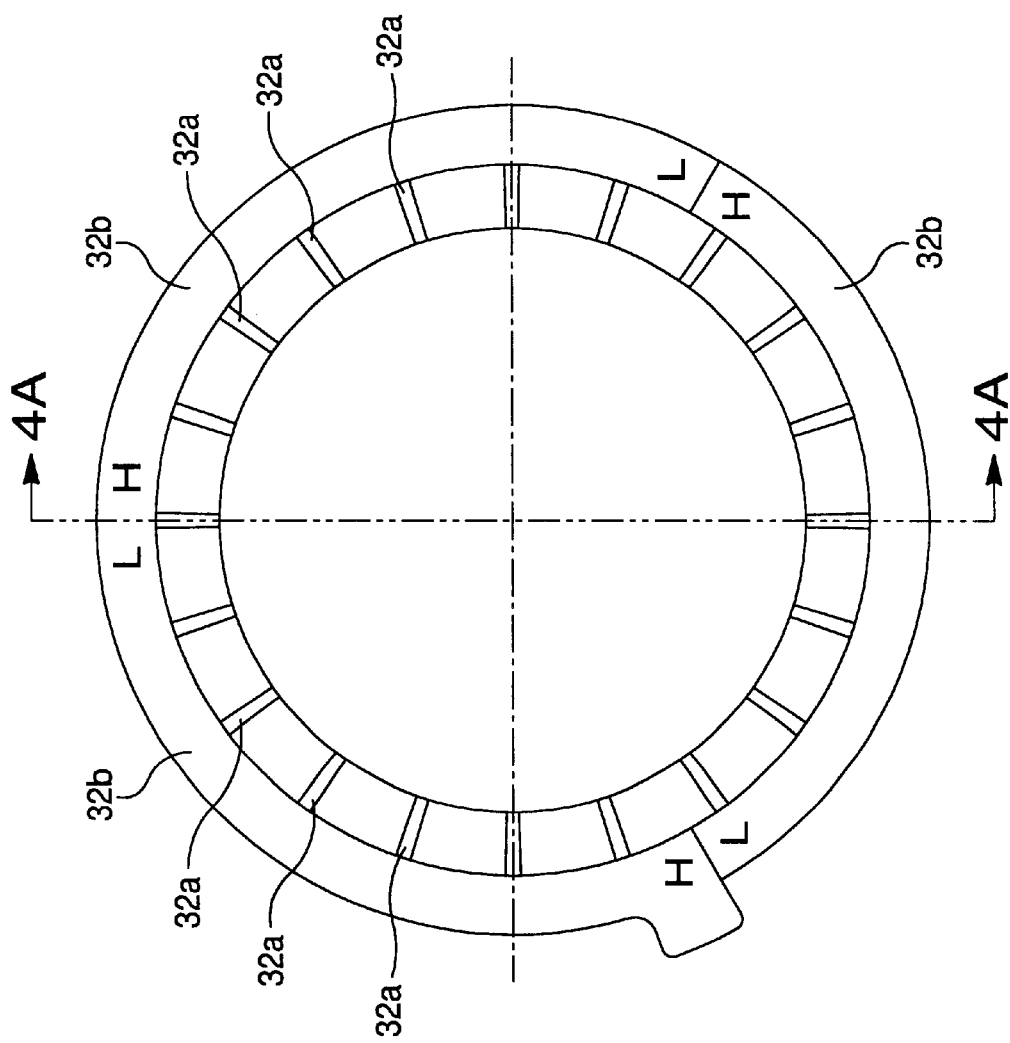
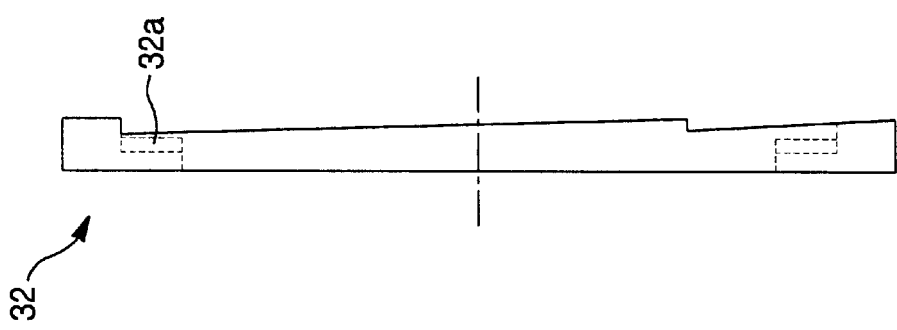

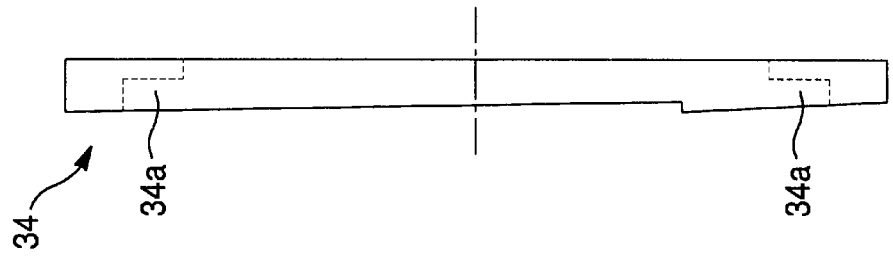
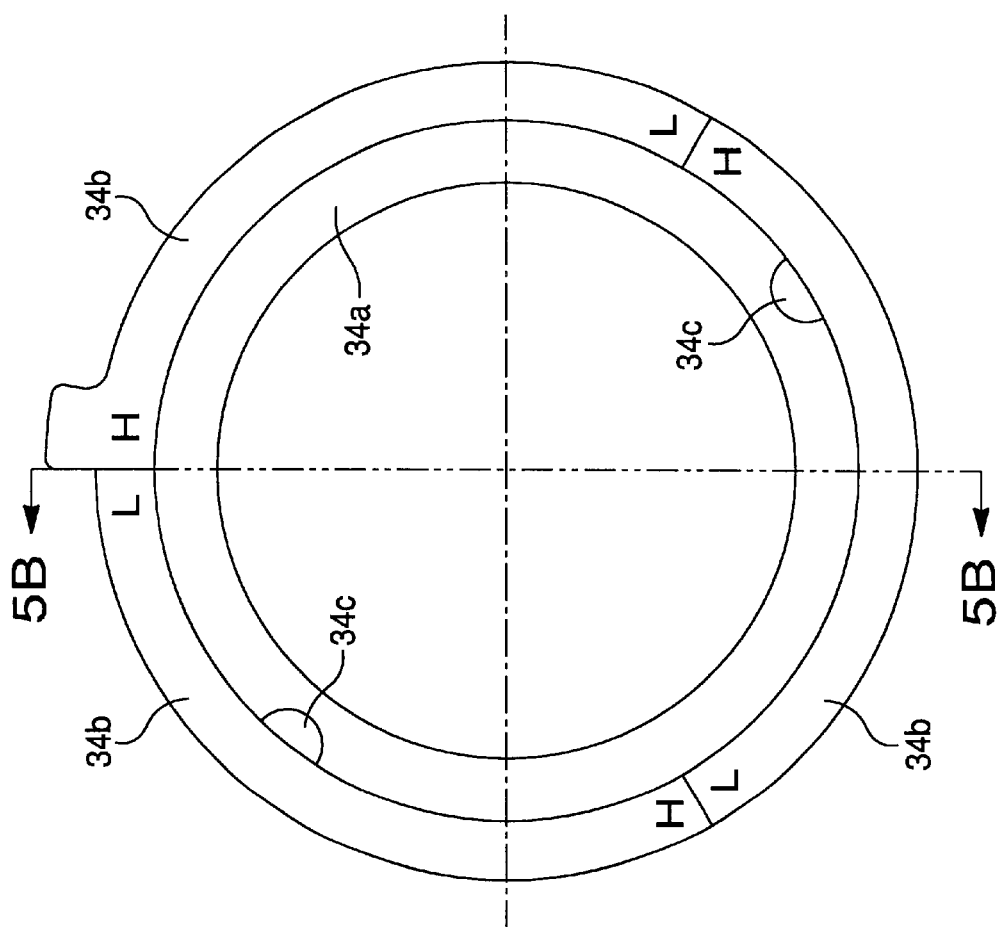

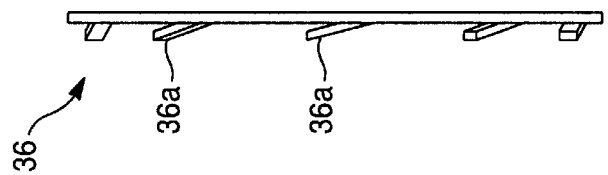
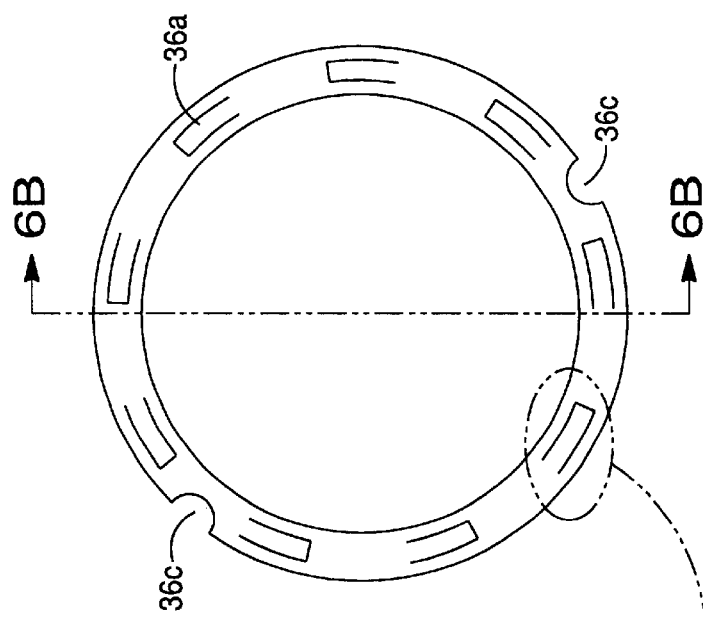
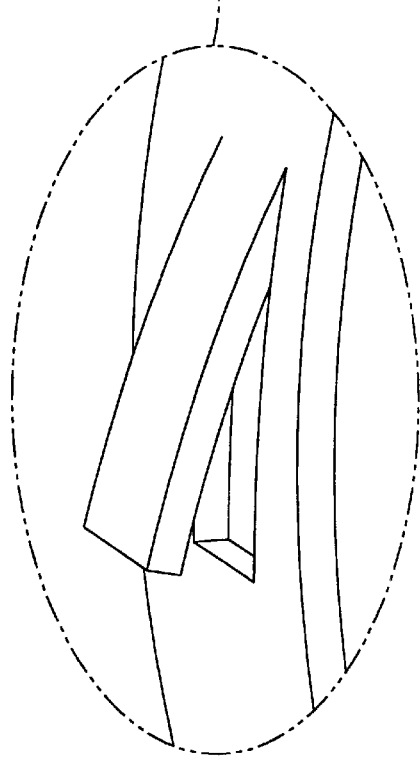

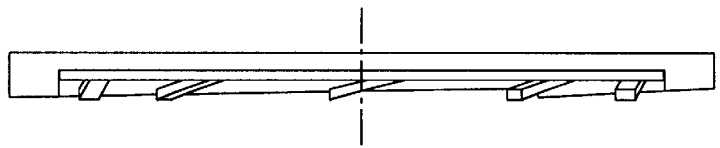
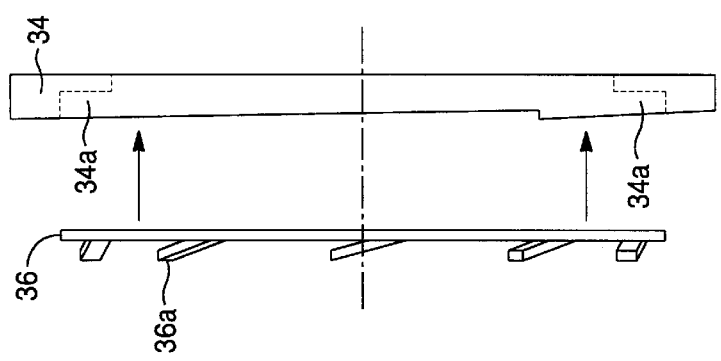
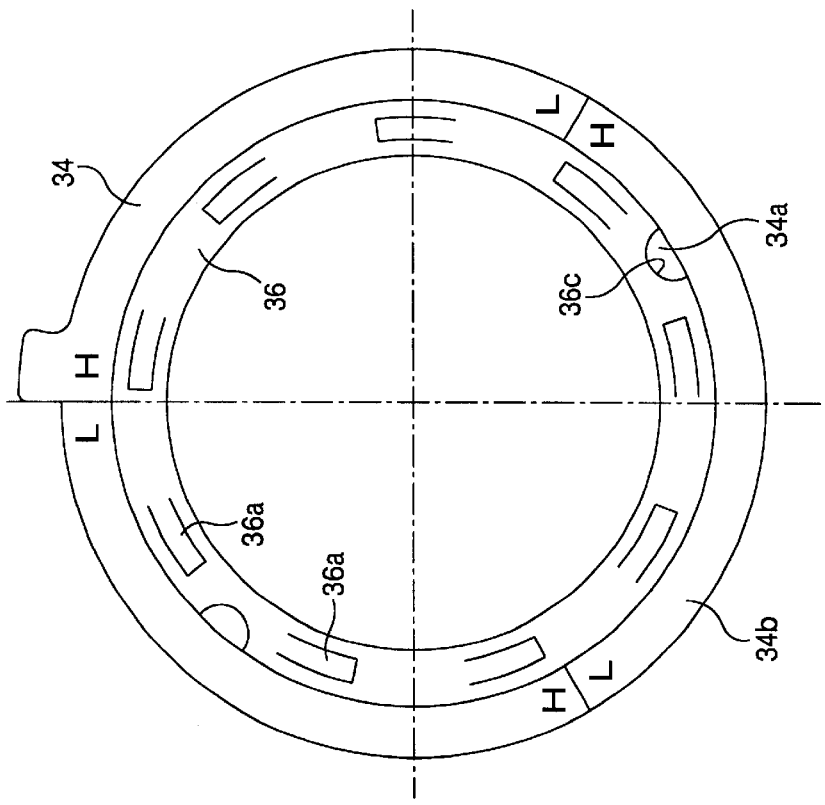

Fig. 8
Fig. 9
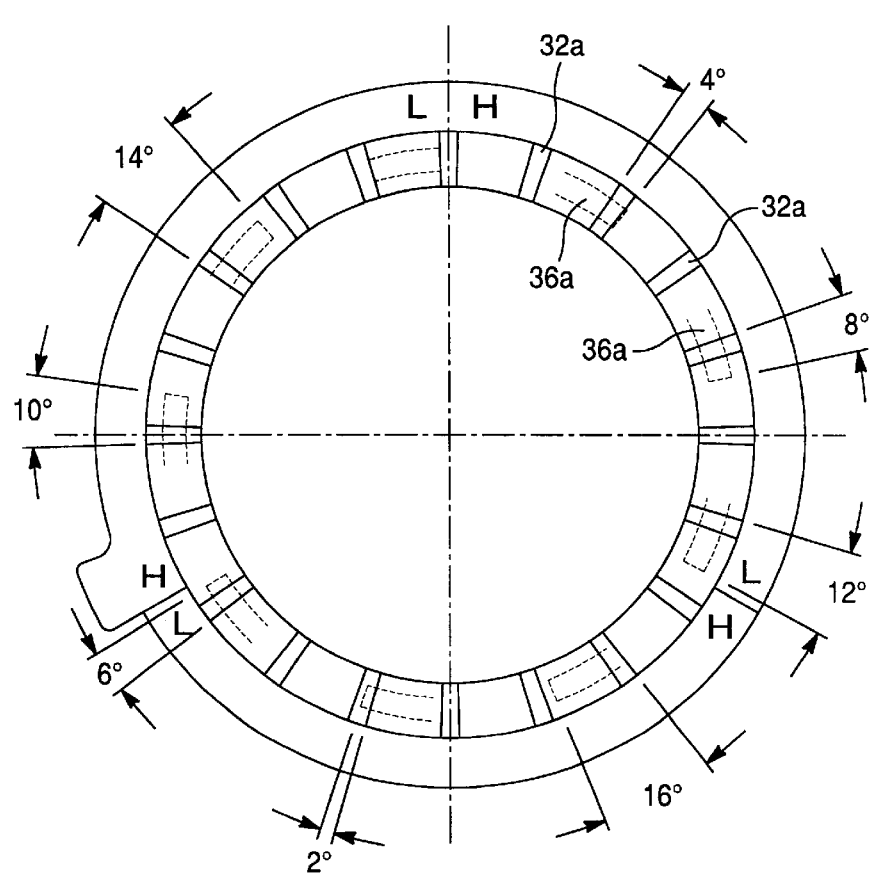
Fig. 10
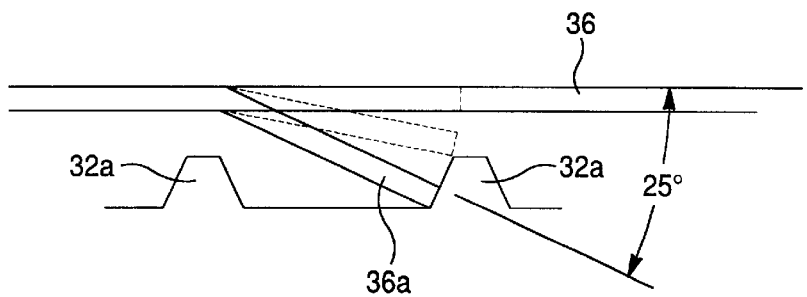

ADJUSTABLE PRELOAD SHIM FOR TAPERED BEARINGS

BACKGROUND OF THE INVENTION

1. Field of the Invention

The present invention relates to bearing mounts. More particularly, the present invention relates to a simplified adjustment assembly which interacts between a bearing assembly and the housing within which the bearing assembly is supported. Specifically, the present invention relates to an assembly by which to effect incremental adjustments to the axial end play of, or the preload on, the outer race of a bearing assembly, either alone or in a set.

2. Description of Related Art

With journal arrangements for which thrust loading is not reasonably anticipated, and within which cylindrical bearings are appropriate to support radial loading, it is customary to utilize some structure by which to effect axial retention of the bearings that rotatably support a shaft, or the like. The shaft may apply a reasonable thrust load on the bearing, such that the bearing will remain seated within the housing. When the environment in which the Journal arrangement is employed is such that both radial and thrust loading is expected, one generally considers the use of tapered bearing sets because they create excellent rotational support for a shaft subjected to such loading without impairing rotation of the shaft. However, other alternatives are often employed because of difficulties heretofore experienced in adjusting the axial end play of, or the preload on, the races which support the rollers in a tapered bearing assembly.

Thrust loading is transferred by the individual bearing assemblies from the shaft to the journal box or housing. Generally, the inner race of each bearing assembly abuts a shoulder on the rotatable shaft. The outer race similarly abuts an opposed shoulder on the housing in which the bearing is supported. The structure, which presents the opposed shoulders between which the bearing set is captured, must permit assembly of the shaft and both bearing assemblies into the housing. Moreover, even if opposed, rigid shoulders could be provided, such an arrangement would not allow for any variation or adjustment in the end play of, or the preloading applied to, the bearing set.

It is, however, difficult to achieve and maintain incremental adjustments of the small magnitude desired by using a nut threaded onto the end of the shaft. Nuts are often crenelated to permit a safety wire or clip to be inserted through a diametric bore in the shaft in order to secure the selected position of the nut. However, the magnitude of the adjustments permitted by the aforesaid arrangement is limited to a function of the thread pitch and the number of crenelations as well as their angular disposition.

To accomplish incremental adjustments of a small or fine magnitude, a variety of arrangements have been developed which utilize shims interposed between one race of the bearing set and a bearing retainer. The shims utilized by such prior art assemblies are available in a plurality of dimensions so that the selection of appropriately sized shims will generally achieve the desired end play or preloading. However, the installation of a typical shim assembly generally requires a rather complicated series of steps. For example, one must normally measure the gap between one race of the bearing assembly and the bearing retainer to determine the size of the shim or shims required, and the shim or a combination of shims must then be selected. The selected shim(s) must then be appropriately inserted between the selected race of the bearing assembly and the bearing retainer. The installation is not concluded until a final measurement has been made to verify that the proper end play and preloading has been achieved.

The installation of prior known shim assemblies is, therefore, a relatively complicated process for which considerable expertise is required, and for which shims must be available in a wide variety of sizes in order for the desired end play or preloading to be effected. Another form of a prior art bearing adjusting assembly employs opposed cams or ramps. The use of cams or ramps allows for a wide range in the amount of end play or preloading adjustment available and reduces the number of components which must be stocked. However, the locking means heretofore employed in conjunction with cams or ramps to secure the selected adjustment, generally comprises a plurality of bolts or other locking tabs that are receivable within bores. The need to provide threaded bores, however, creates a problem in that discrete placement of threaded bores to receive the bolts severely restricts usage of the array to that permitted by the particular placement of the bores.

SUMMARY OF THE INVENTION

It is a primary object of the present invention to provide a simplified assembly by which to effect incremental adjustments to the end play of, and the preload on, a bearing set.

It is another object of the present invention to provide an adjusting assembly, as above, which incorporates a relatively uncomplicated arrangement by which to secure the selected end play and preload, by moving the bearing race upon which the adjusting assembly acts through dimensional increments.

It is a further object of the present invention to provide an adjusting assembly, as above, which does not require stocking a plurality of different size shims.

It is still another object of the present invention to provide an adjusting assembly, as above, which assures that the selected end play and preloading will be maintained, and which can thereafter be further adjusted as necessary or desired, with relative ease.

The objectives of the present invention are achieved by an adjustable thickness bearing preload assembly comprising a first thrust ring with indexing teeth, a second thrust ring without indexing teeth, and an indexing spring. The thrust rings are formed with ramped surfaces and are assembled side-by-side with the ramped surfaces facing each other. By rotating one thrust ring with respect to the other, the combined thickness of the rings will increase or decrease due to the ramping action. The indexing spring is essentially a stamped circular ring with indexing pawls projecting from the flat surface. The pawls engage the indexing teeth on the first thrust ring. When the indexing spring is rotated relative to the thrust ring, the pawls will deflect and ride over the thrust ring indexing teeth. When rotation is reversed, the pawls engage the thrust ring teeth and prevent reverse rotation.

By attaching the indexing spring to the thrust ring without teeth, the two thrust rings can be rotated in one direction relative to each other to increase the thickness, but will not reverse direction due to pawl-to-tooth contact.

Assembly of the two thrust rings and indexing spring is simplified when compared to the conventional preload assemblies. The indexing spring is positioned in the counterbore of the toothless thrust ring with pawls facing outward. The outer diameter of the indexing spring is notched to prevent rotation relative to the thrust ring. The toothed thrust ring is then positioned over the indexing spring to complete the assembly of the shim. The indexing spring remains trapped between the two thrust rings. The angular adjustment resolution can be fine-tuned y varying the number of indexing spring pawls and the thrust ring teeth.

These and other objects of the invention, as well as the advantages thereof over existing and prior art forms which will be apparent in view of the following detailed specification, are accomplished by means hereinafter described and claimed.

BRIEF DESCRIPTION OF THE DRAWING

Other objects and advantages of the invention will become apparent from a study of the following specification when viewed in light of the accompanying drawings, wherein:

FIGS. 4A and 4B are plan and sectional views of the first thrust ring;

FIGS. 5A and 5B are plan and sectional views of the second thrust ring;

FIGS. 6A–6C are plan and sectional views of the indexing spring with FIG. 6C being a partially exploded view of the indexing pawl;

FIGS. 7A–7C show the first thrust ring and indexing spring at various stages of assembly.

FIG. 8 shows the adjustable thickness bearing preload assembly in an assembled state.

FIG. 9 shows the angular relation of the indexing pawls to the indexing teeth.

FIG. 10 shows the interaction of an indexing pawls and the indexing teeth.

DETAILED DESCRIPTION OF PREFERRED EMBODIMENT

The preferred embodiments of the present invention will now be described with the reference to accompanying drawings.

Figure 1:
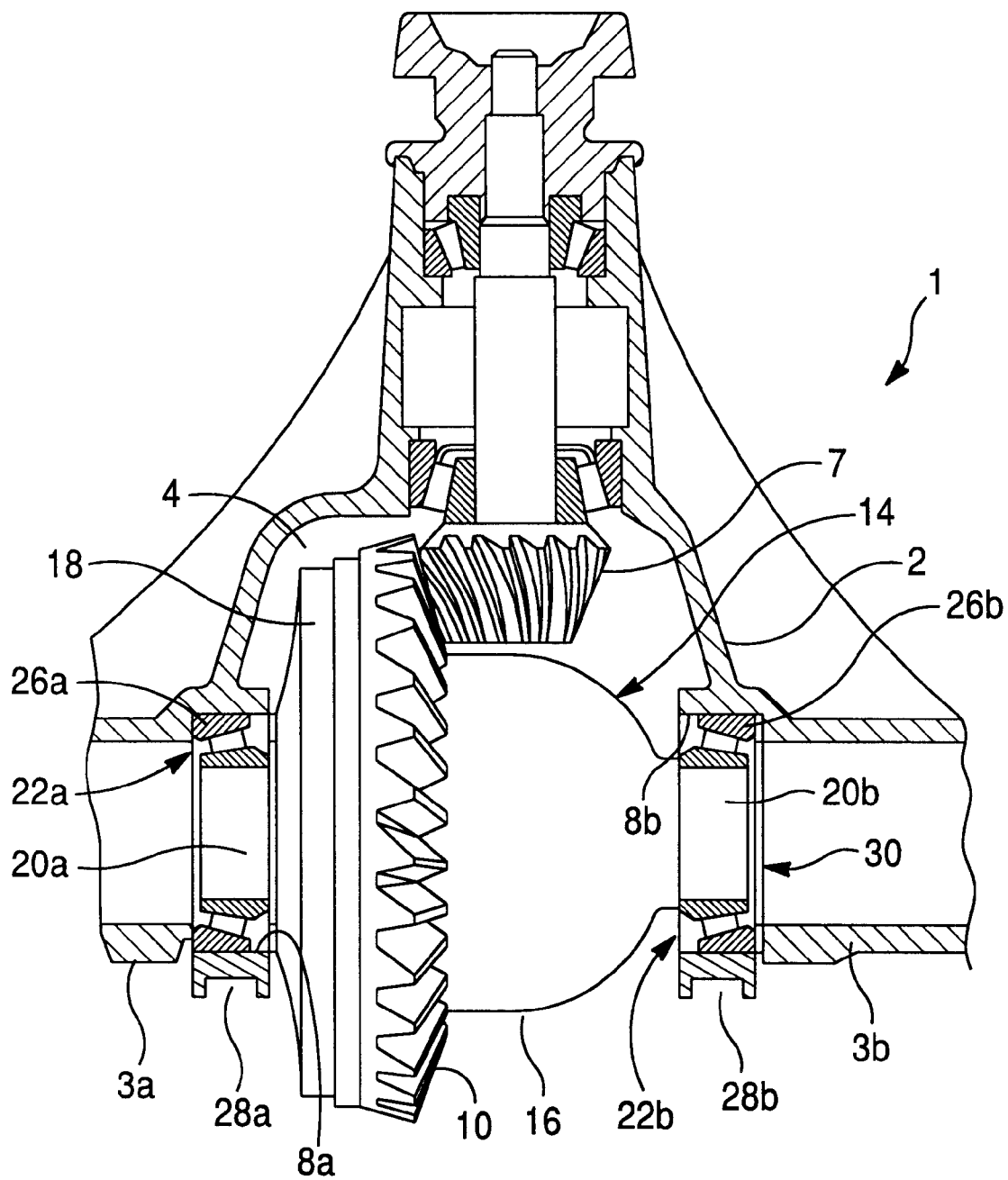
FIG. 1 is a fragmentary, partial sectional view of a differential assembly.

Referring now to the drawings, a vehicular axle assembly 1 is shown in FIG. 1, and includes a differential housing 2 carried on the underside of a vehicle (not shown). The differential housing 2 may include left and right axle tubes 3a and 3b respectively, projecting coaxially from opposite sides, or could be part of an independent suspension axle which would not require axle tubes 3a and 3b. The differential housing 2 defines a cavity 4 adapted for receiving a differential assembly 14 therewithin. The axle assembly 1 further includes a power input pinion gear 7 secured to a drive shaft. The pinion gear 7 meshes with a ring gear 10, which in turn is secured to a ring gear flange 18 associated with a differential case 16. The differential case 16 along with the ring gear 10 is rotatably mounted in the axle housing 2.

Figure 2:
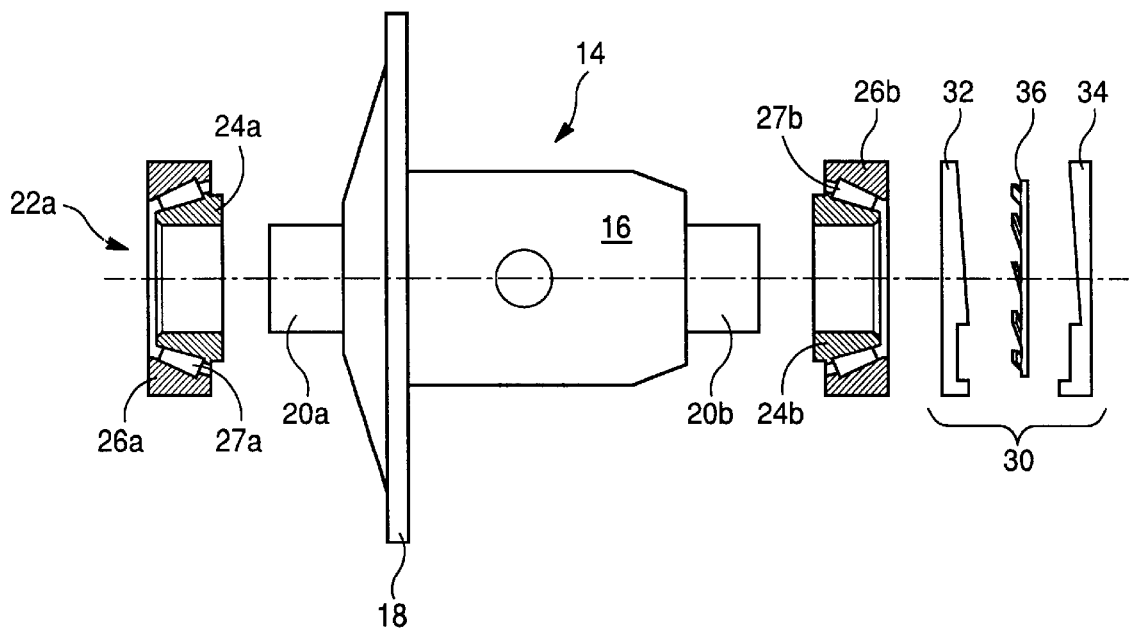
FIG. 2 is a view showing a differential case without a ring gear, with two bearing assemblies with a schematic representation of the preload adjustment system.
Figure 3:
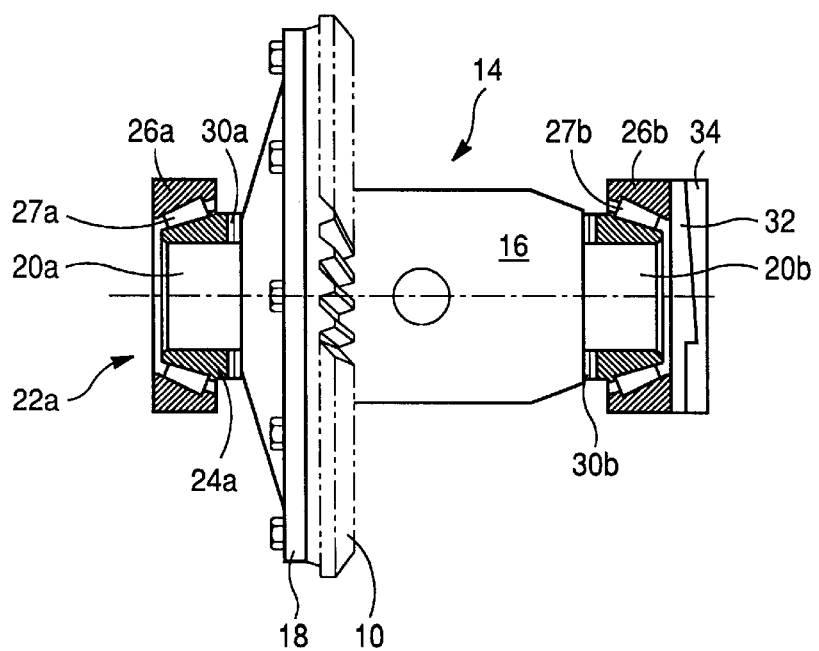
FIG. 3 is a view, partially in phantom and partially in cross-section, of a preloaded differential case assembly with bearings and adjustable thickness bearing preload assembly.

The differential assembly 14, illustrated in FIGS. 2 and 3, is a conventional differential assembly well known in the art. The differential assembly 14 includes the differential case 16 having the flange 18, and two opposite cylindrical bearing hubs 20a and 20b at each lateral end thereof. The ring gear 10 is fastened to the flange 18, typically by a plurality of bolts (not shown).

The differential case 16 is rotatably supported in the bearing bores 8a and 8b by means of anti-friction bearings. Preferably, the anti-friction bearings are tapered roller bearings 22a and 22b that are pre-assembled units including associated bearing caps 28a and 28b. The bearing caps 28a, 28b are secured to bearing blocks formed in the differential housing 2.

The bearing 22a is disposed between the bearing block bore and the bearing hub 20a. Correspondingly, the bearing 22b is disposed between the bearing block bore and the bearing hub 20b. Each of the bearings 22a and 22b includes an inner race (24a and 24b) mounted to the associated bearing hub (20a or 20b), the bearing cup (26a and 26b) and a plurality of tapered rolling elelements (27a and 27b) disposed therebetween.

For preloading of the bearings 22a and 22b, an adjustable thickness bearing preload assembly 30 is used. The adjustable thickness bearing preload assembly 30 comprises a first thrust ring 32 with indexing teeth 32a, a second thrust ring 34 without indexing teeth, and an indexing spring 36. With reference to FIGS. 4A–5B, the thrust rings 32, 34 are formed with ramped surfaces 32b, 34b and the rings are assembled in a side-by-side manner with the ramped surfaces 32b, 34b facing each other. The ramped surfaces 32b, 34b extend from a high point 'H' to a low point 'L' with three ramps being shown in FIGS. 4A through 5B.

The second thrust ring 34 is formed with a recessed annular portion 34a formed to receive the indexing spring 36. The recessed annular portion 34a is formed with locking projections 34c to mate with correspondence notches formed 36c in the indexing spring 36.

With reference to FIGS. 6A–6C, the indexing spring 36 is essentially a stamped circular ring with indexing pawls 36a projecting from the flat surface. The indexing pawls 36a are shown in FIG. 6C. The indexing spring 36 is formed with notches 36c formed to mate with the locking projections 34c formed on the second thrust ring 34 to prevent relative rotation therebetween.

With reference to FIGS. 7A–7C, the indexing spring 36 is disposed within the recessed annular portion 34a of the second thrust ring 34 such that the notches 36c mate with locking projections 34c.

By rotating one thrust ring with respect to the other, the combined thickness of the rings will increase or decrease due to the ramping action. The pawls 36a engage the indexing teeth 32a on the first thrust ring 32. When the indexing spring 36 is rotated relative to the thrust ring, the pawls 36a will deflect and ride over the thrust ring indexing teeth 32a. When rotation is reversed, the pawls 36a engage the thrust ring teeth 32a and prevent reverse rotation.

By attaching the indexing spring to the thrust ring without teeth, the two thrust rings can be rotated in one direction relative to each other to increase the thickness, but will not reverse direction due to pawl-to-tooth contact.

Assembly of the two thrust rings and indexing spring is simplified when compared to the conventional preload assemblies. The indexing spring 36 is positioned in the counterbore 34a of the toothless thrust ring 34 with pawls 36a facing outward. The outer diameter of the indexing spring is notched (see notch 36c) to prevent rotation relative to the thrust ring 34. The toothed thrust ring 32 is then positioned over the indexing spring 36 to complete the assembly of the adjustable shim 30. The indexing spring 36 remains trapped between the two thrust rings 32, 34. The angular adjustment resolution can be fine-tuned y varying the number of indexing spring pawls 36a and the thrust ring teeth 32a.

Thus, it should be apparent that a system embodying the concepts of the present invention effectively secures the desired end play for a tapered bearing. It should also be apparent to one skilled in the art, that the inclination of the ramp surfaces 53 and 54, as well as the size and number of the locking pawls 46 and the blocking teeth 52, may be varied to provide the particular axial translation of the first ring means 25 in response to a predetermined angular rotation of the second ring means 35 without departing from the spirit of the present invention.

As should now be apparent, the present invention not only provides a simplified assembly by which to effect incremental adjustments to the end play and preload of a bearing but also accomplishes the other objects of the invention.

What is claimed is:

1. An adjustable bearing preload assembly, comprising:
    a first thrust ring having a first plurality of ramped surfaces and a plurality of indexing teeth;
    a second thrust ring having a second plurality of ramped surfaces, said first plurality of ramped surfaces facing said second plurality of ramped surfaces;
    an indexing spring having a plurality of indexing pawls that selectively engage said indexing teeth.

2. The adjustable bearing preload assembly of claim 1, wherein said indexing spring is disposed between said first and second thrust rings.

3. The adjustable bearing preload assembly of claim 1, wherein said indexing spring is disposed with a counterbore provided in said second thrust ring.

4. The adjustable bearing preload assembly of claim 1, wherein said indexing spring is non-rotatably disposed with respect to said second thrust ring.

5. The adjustable bearing preload assembly of claim 1, where the number of indexing teeth exceed the number of indexing pawls.

6. The adjustable bearing preload assembly of claim 1, wherein said first plurality of ramped surfaces and said plurality of indexing teeth are disposed on a single side of said first thrust ring facing said second thrust ring.

7. The adjustable bearing preload assembly of claim 1, wherein said second thrust ring abuts an outer racing of a bearing assembly.

8. The adjustable bearing preload assembly of claim 7, wherein said bearing assembly is disposed between a differential case and a carrier of a differential assembly.

9. The adjustable bearing preload assembly of claim 7, wherein said assembly interacts between a bearing assembly and a housing within which the bearing assembly is supported.

10. The adjustable bearing preload assembly of claim 1, wherein the number of indexing pawls is nine and the number of indexing teeth is twenty.

* * * * *